US011898507B2

(12) United States Patent
Zhang et al.

(10) Patent No.: US 11,898,507 B2
(45) Date of Patent: Feb. 13, 2024

(54) METHOD AND CONTROL APPARATUS FOR OPERATING A TANK VENTILATION SYSTEM OF AN INTERNAL COMBUSTION ENGINE

(71) Applicant: Vitesco Technologies GmbH, Regensburg (DE)

(72) Inventors: Hong Zhang, Tegernheim (DE); Gerhard Haft, Maxhütte-Haidhof (DE)

(73) Assignee: Vitesco Technologies GmbH, Regensberg (DE)

( * ) Notice: Subject to any disclaimer, the term of this patent is extended or adjusted under 35 U.S.C. 154(b) by 0 days.

(21) Appl. No.: 18/168,083

(22) Filed: Feb. 13, 2023

(65) Prior Publication Data

US 2023/0265805 A1 Aug. 24, 2023

Related U.S. Application Data

(63) Continuation of application No. PCT/EP2021/072522, filed on Aug. 12, 2021.

(30) Foreign Application Priority Data

Aug. 13, 2020 (DE) ..................... 10 2020 210 299.6

(51) Int. Cl.
*F02D 41/00* (2006.01)

(52) U.S. Cl.
CPC ....... *F02D 41/004* (2013.01); *F02D 41/0045* (2013.01)

(58) Field of Classification Search
CPC ........................... F02D 41/004; F02D 41/0045
(Continued)

(56) References Cited

U.S. PATENT DOCUMENTS

2013/0213366 A1 8/2013 Weigl
2013/0255645 A1 10/2013 Grass
(Continued)

FOREIGN PATENT DOCUMENTS

DE 19650517 A1 6/1998
DE 102010054668 A1 6/2012
(Continued)

OTHER PUBLICATIONS

International Search Report and Written Opinion dated Dec. 3, 2021 from corresponding International Patent Application No. PCT/EP2021/072522.

(Continued)

*Primary Examiner* — Mahmoud Gimie

(57) ABSTRACT

A method for determining the load of a fuel vapor retention filter in a fuel evaporation retention system of an internal combustion engine. The fuel evaporation retention system includes: a fuel supply container for storing fuel, a connection line which couples the fuel supply container to the fuel vapor retention filter, a regeneration line which couples the fuel vapor retention filter to an intake tract of the internal combustion engine and in which an electrically controllable flow control valve is arranged, a ventilation line which couples the fuel vapor retention filter to the atmosphere, an electrically controllable purging air pump arranged in the regeneration line, such that purging air can be directed through the fuel vapor retention filter and supplied to the intake tract in order to regenerate the fuel vapor retention filter.

14 Claims, 3 Drawing Sheets

(58) Field of Classification Search
USPC .......................................................... 123/520
See application file for complete search history.

(56) References Cited

U.S. PATENT DOCUMENTS

| | | | | | |
|---|---|---|---|---|---|
| 2014/0245997 | A1 | | 9/2014 | Zhelyaskov | |
| 2018/0216578 | A1 | | 8/2018 | Wodausch | |
| 2018/0372030 | A1 | * | 12/2018 | Achleitner | F02M 25/0854 |
| 2019/0101082 | A1 | | 4/2019 | Sanuma | |
| 2020/0191072 | A1 | | 6/2020 | Ahn | |

FOREIGN PATENT DOCUMENTS

| | | | | | |
|---|---|---|---|---|---|
| DE | 102017201530 | A1 | | 8/2018 | |
| DE | 112017001080 | T5 | | 11/2018 | |
| DE | 102017210768 | A1 | * | 12/2018 | F02D 41/0002 |
| DE | 102017210768 | A1 | | 12/2018 | |
| EP | 2627889 | A1 | | 8/2013 | |
| JP | 2018017182 | A | | 2/2018 | |
| JP | 2018017185 | A | | 2/2018 | |
| KR | 20190130744 | A | * | 11/2019 | F02M 25/0836 |

OTHER PUBLICATIONS

German Office Action dated Mar. 3, 2021 for corresponding German Patent Application No. 10 2020 210 299.6.

* cited by examiner

METHOD AND CONTROL APPARATUS FOR OPERATING A TANK VENTILATION SYSTEM OF AN INTERNAL COMBUSTION ENGINE

CROSS-REFERENCE TO RELATED APPLICATIONS

This application claims the benefit of International Application PCT/EP2021/072522, filed Aug. 12, 2021, which claims priority to German Application 10 2020 210 299.6, filed Aug. 13, 2020. The disclosures of the above applications are incorporated herein by reference.

TECHNICAL FIELD

The disclosure relates to a method and a control device for operating a tank ventilation system of an internal combustion engine.

BACKGROUND

To limit pollutant emissions, modern motor vehicles, which are driven by internal combustion engines, are equipped with fuel evaporation retention systems, commonly referred to as tank ventilation apparatuses. The purpose of such apparatuses is to accommodate and temporarily store fuel vapor that forms in a fuel tank as a result of evaporation, such that the fuel vapor cannot escape into the environment. As storage for the fuel vapor, a fuel vapor retention filter which uses, for example, activated carbon as storage medium is provided in the fuel evaporation retention system. The fuel vapor retention filter has only a limited storage capacity for fuel vapor. In order to be able to use the fuel vapor retention filter over a long period of time, it has to be regenerated. For this purpose, a controllable tank ventilation valve is arranged in a line between the fuel vapor retention filter and an intake pipe of the internal combustion engine, the valve being opened in order to carry out the regeneration, and therefore, on the one hand, the fuel vapors adsorbed in the fuel vapor retention filter escape into the intake pipe as a result of the negative pressure in the latter, and are thus supplied to the intake air of the internal combustion engine and therefore to the combustion process, and, on the other hand, the absorption capacity of the fuel vapor retention filter for fuel vapor is restored.

A regeneration process of the fuel vapor retention filter is therefore only possible if a negative pressure prevails in the intake pipe in relation to the tank ventilation device.

New vehicle concepts with a hybrid drive and start/stop functionality are a means of complying with legislated emissions values and reducing fuel consumption. At the same time, however, these lead to a significant reduction in the purging rates for the regeneration of the fuel vapor retention filter, since the effective time in which purging can take place is reduced by the temporary shutdown of the internal combustion engine.

Furthermore, dethrottling of the internal combustion engines as a result of the elimination of the throttle valve, and control of the incoming air mass using the inlet valves (VVT, variable valve drive) and/or exhaust gas turbocharging leads to the fact that the negative pressure in the intake pipe that is required for the purging of the fuel vapor retention filter is no longer present to a sufficient extent.

In DE 10 2010 054 668 A1 an internal combustion engine is described with a fuel tank, a fuel vapor store for storing fuel vapors that escape from the fuel tank, a connecting line between the fuel vapor store and an air intake tract of the internal combustion engine to conduct fuel vapors from the fuel vapor store into the air intake tract during a regeneration phase, a valve arranged in the connecting line, a venting line for the fuel vapor store and a valve unit arranged in the venting line for controlling the venting of the fuel vapor store. A purge air pump is arranged in the venting line for the fuel vapor store and is integrated in the valve unit for controlling the venting of the fuel vapor store. In this way, particularly effective purging or regeneration of the fuel vapor store itself is achieved, even if no negative pressure, or only a slight negative pressure, is provided by the air intake tract.

During the tank ventilation process, an additional portion of fuel enters the combustion chamber of the internal combustion engine from the fuel vapor retention filter when the gas inlet valve is open. In order to ensure correct operation of the internal combustion engine and compliance with exhaust gas limits, the portion of fuel has to be taken into account in the amount of fuel to be supplied in total, this amount being calculated by the engine control unit for the instantaneous operating point of the internal combustion engine. For controlling the purging flow and the injection correction, knowledge that is as accurate as possible of the vaporous portion of fuel (HC/air mixture from the fuel vapor retention filter), that is to say, the degree of loading of the fuel vapor retention filter, is thus necessary.

The degree of loading is determined in conventional systems by evaluating the signal deviation of a lambda probe arranged in the exhaust gas tract upstream of an exhaust gas catalytic converter as the tank ventilation valve is slowly being opened. Since deviations of the lambda probe signal can also be attributed to other causes, for example, as a result of a load change, determination of the degree of loading on the basis of this signal deviation may lead to erroneous results. The consequence of this is an erroneous calculation of the injection quantity, this possibly leading to increased exhaust gas emissions, increased fuel consumption and poorer driveability. In addition, only very little HC gas can be regenerated during this relatively long learning phase.

A method and a device for operating a tank ventilation system for an internal combustion engine are described in EP 2 627 889 B1. The tank ventilation system has an adsorption tank, a regeneration passage and an electrically driven pump. The adsorption tank is used for collecting and temporarily storing fuel vapors emerging from a fuel tank, with a purge air flow being able to flow through the adsorption tank. The regeneration passage connects the adsorption tank with an intake passage. A pump designed to suck the purge air out of the adsorption tank and to mix it with intake air in the intake passage is arranged in the regeneration passage.

A density of the purge air flowing in the regeneration passage is determined. Furthermore, a purge air mass flow flowing in the regeneration passage is determined depending on the density of the purge air and a predetermined pump characteristic of the pump.

DE 196 50 517 A1 describes a method and a device for tank ventilation of a direct-injection internal combustion engine. With the aid of an overpressure pump in a regeneration line between an adsorption container for fuel vapors and an intake passage of the internal combustion engine, it is possible also to carry out such a purging in all operating ranges of the internal combustion engine in which purging of the adsorption tank is possible, regardless of the negative pressure currently prevailing in the intake passage.

US 2014/0 245 997 A1 discloses a tank ventilation system for an internal combustion engine with pressure-assisted purging of the fuel vapors. In order even at operating points of the internal combustion engine at which there is no or only a slight negative pressure prevailing in the intake pipe, it is proposed to use a purging pump in conjunction with one or more Venturi nozzles to increase the pressure. This enables the pressure to be increased and the canister to be purged.

DE 10 2017 201 530 A1 describes a tank ventilation system for an internal combustion engine and a method for regenerating a sorption reservoir. The tank ventilation system has the following: a tank, which is connected via tank ventilation to a sorption reservoir for temporarily storing fuel from a tank ventilation flow, a purge air pump for supplying regenerated fuel from the sorption reservoir via a purge air flow to an intake air flow to the internal combustion engine, with a controller being provided which is designed to control the purge air pump in such a way that the purge air flow can be adjusted in terms of its pressure, its mass and/or its volume, such that the regenerated fuel is metered into the intake air flow via the purge air flow in accordance with an operating state of the internal combustion engine. Furthermore, a method for regenerating a sorption reservoir using the tank ventilation system described is disclosed.

DE 11 2017 001 080 T5 discloses an evaporator fuel treatment device mounted on a vehicle. The treatment device has the following: a container configured to adsorb the fuel vaporized in a fuel tank; a purging passage which is connected between the container and a suction path of the engine and through which a purging gas emitted from the container enters the suction path; a pump configured to emit the purging gas from the container to the suction path; a control valve arranged on the purging passage and configured to switch between a connecting state and a shut-off state, the connecting state being a state in which the container and the suction path are connected by the purging passage, and the shut-off state being a state in which the container and the suction path are separated on the purging passage; a branch passage which branches from the purging passage at an upstream end of the branch passage and enters the purging passage at a downstream end of the branch passage, the downstream end of the branch passage being at a position different from the upstream end of the branch passage, a pressure specifying unit which has a small-diameter region which is arranged on the branch passage and through which the purging gas enters the branch passage and which is designed for specifying a pressure differential of the purging gas which passes through the small-diameter region between an upstream side and a downstream side of the small-diameter region; an air-fuel ratio sensor arranged at an exhaust gas passage of the engine; and an estimating unit configured to estimate a first flow rate of the purging gas sent out from the pump using an evaporator fuel concentration in the purging gas estimated using an air-fuel ratio which is detected by the air-fuel ratio sensor, and the pressure differential specified by the pressure specifying unit.

SUMMARY

The disclosure provides a method and a control device with which the loading of a fuel vapor retention filter in a fuel evaporation retention system of an internal combustion engine can be accurately determined in a simple manner.

One aspect of the disclosure provides a method and a corresponding control device for determining the loading of a fuel vapor retention filter in a fuel evaporation retention system of an internal combustion engine. The fuel evaporation retention system includes at least: a fuel storage tank for storing fuel; a connecting line which couples the fuel storage tank to the fuel vapor retention filter; a regeneration line; which couples the fuel vapor retention filter to an intake tract of the internal combustion engine and in which an electrically activatable flow control valve is arranged; a venting line which couples the fuel vapor retention filter to the atmosphere; and an electrically activatable purge air pump arranged in the regeneration line, such that purge air can be conducted through the fuel vapor retention filter and supplied to the intake tract of the internal combustion engine for regenerating the fuel vapor retention filter. The purge air pump is switched on with the flow control valve closed, and, upon reaching a constant rotational speed of the impeller of the purge air pump conveying the purge air, a value is detected for the pressure in the regeneration line upstream of the purge air pump and a value is detected for the pressure in the regeneration line downstream of the purge air pump, and from these pressure values, a value for a differential pressure is determined across the purge air pump. A value for the degree of loading of the fuel vapor retention filter is then assigned to the differential pressure. The method is carried out during one or more predetermined periods of time and/or one or more predetermined operating phases of the internal combustion engine and the respectively determined degrees of loading of the fuel vapor retention filter are taken into account in the injection calculation of the internal combustion engine.

In some implementations, at a predetermined rotational speed of the purge air pump, the pressure generated by the purge air pump depends on the density of the medium being conveyed, that is to say, on the density of the HC/air mixture from the fuel vapor retention filter.

Depending on the degree of loading and thus on the composition of the purging flow, different densities of the purging flow arise. Since the densities of air and hydrocarbons (HC) differ significantly, the hydrocarbon concentrations (HC concentrations), that is to say, the degree of loading of the fuel vapor retention filter, can be deduced in a simple manner by detecting and evaluating the pressure values upstream and downstream of the purge air pump.

If the described determination of the loading is carried out before the actual purging phase, that is to say, before the regeneration of the fuel vapor retention filter and with the flow control valve closed, the initial opening of the flow control valve can take place significantly faster and with a more precise injection correction, on the basis of the supplied vaporous fuel, to that of the fuel vapor retention filter. This means an increase in the purging rate can take place with lower lambda drifts, and driveability problems are also minimized.

In some examples, the method is carried out during predetermined periods of time and/or operating phases of the internal combustion engine. In this way, periods of time which are expected to deliver particularly meaningful measurement results can be predefined. As a result, the degree of loading of the fuel retention filter can be determined more precisely overall.

In some implementations, at least one of the periods of time is a heating phase of the fuel storage tank. In some implementations, such a heating phase is a period of time during the day during which the fuel storage tank heats up because of an increase in temperature in the environment. The increase in temperature/heating can be detected by means of a temperature sensor, whereupon the method is carried out. The internal combustion engine here can be operated, In some implementations, or not operated, according to another example. During an increase in temperature of the fuel storage tank, the fuel outgasses. These gases collect in the fuel vapor retention filter and can accordingly increase the degree of loading if gases/vapors can still be absorbed. The determination of the degree of loading during or after such a heating phase can accordingly be carried out particularly precisely.

In some implementations, at least one of the periods of time is a cooling-down phase of the fuel storage tank. In some implementations, such a cooling-down phase is a period of time at night during which the fuel storage tank cools down because of a reduction in temperature of the environment. The reduction in temperature/cooling can be detected by means of a temperature sensor, whereupon the method is carried out. The internal combustion engine here can be operated, In some implementations, or not operated, according to another example. During a cooling-down phase, fresh air can flow through the fuel vapor retention filter, which can affect the degree of loading. Accordingly, it makes sense to determine the degree of loading according to this example during or after a cooling-down phase.

In some implementations, at least one of the periods of time is a period of time with a constant temperature of the fuel storage tank. Such a constant temperature occurs, for example, during operation of the internal combustion engine. The period of time with a constant temperature can be detected by means of a temperature sensor, whereupon the method can be initiated. At a constant temperature of the fuel storage tank, the degree of loading is not influenced by additional outgassing of fuel or by inflowing fresh air, and therefore the determination of the degree of loading can advantageously be carried out precisely.

In some implementations, the method is carried out over a plurality of periods of time and/or operating phases of the internal combustion engine and the degrees of loading in each case determined therefrom are taken into account when determining the current degree of loading of the fuel vapor retention filter. In some implementations, by way of example, the method is first carried out during or immediately after a heating phase and then carried out during or immediately after a cooling-down phase. According to this example, the respective degrees of loading determined from this are then used to determine the current degrees of loading. As a result, the current degree of loading can additionally be advantageously determined precisely. According to a further example, the method can be carried out during or after further operating phases of the internal combustion engine, such as operation of the internal combustion engine or no operation of the internal combustion engine. Additional values of the degree of loading increase the precision of the current loading of the fuel vapor retention filter, as a result of which the injection calculation can advantageously be carried out accurately.

A particularly simple determination of the HC concentration, that is to say, of the degree of loading, ensues, if the relationship between pressure differential and degree of loading is stored in a characteristic map within a memory of a control device controlling and/or regulating the internal combustion engine, where the relationship is determined on the test stand.

Since for determining the degree of loading only two commercially available pressure sensors are required as hardware components, or, in another example, only a single differential pressure sensor is required, the overall result is a very simple and inexpensive solution that provides a reliable and accurate result.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
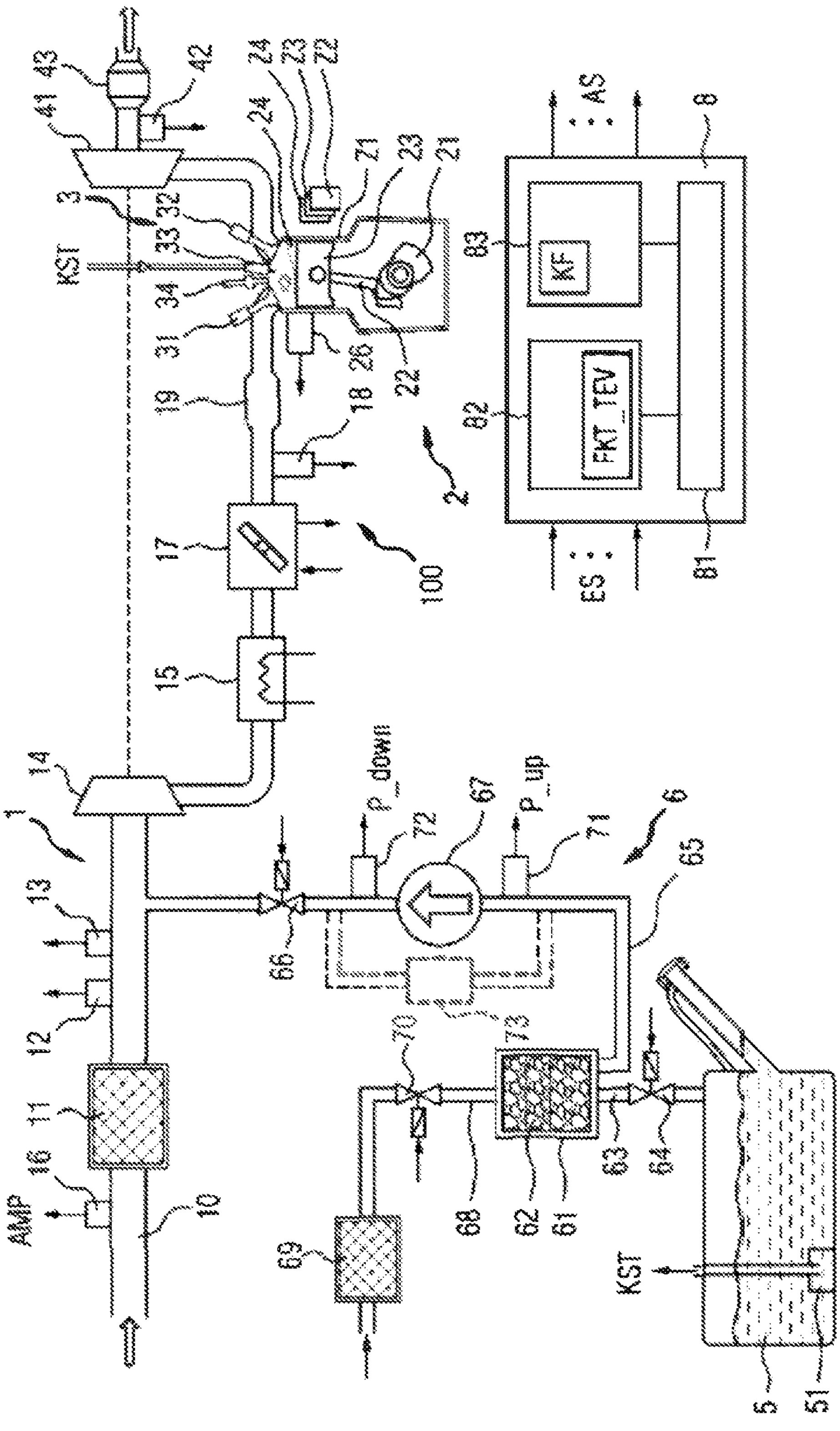
FIG. 1 shows an exemplary internal combustion engine with a tank ventilation system.

FIG. 1 shows a schematic sketch of an internal combustion engine with a fuel evaporation retention system, a charging device in the form of an exhaust gas turbocharger, and a control device. In the interests of clarity, only those parts that are necessary for understanding the disclosure are shown here. For example, only one cylinder of the internal combustion engine is shown.

The internal combustion engine 100 includes an intake tract 1, an engine block 2, a cylinder head 3, and an exhaust gas tract 4.

In the direction of flow of the air taken in, the intake tract 1, starting from an intake opening 10, may include, in succession, an ambient air pressure sensor 16, an air filter 11, an intake air temperature sensor 12, an air mass meter 13 as load sensor, a compressor 14 of an exhaust gas turbocharger, a charge air cooler 15, a throttle valve 17, a pressure sensor 18 and an intake pipe 19 which leads to a cylinder Z1 via an inlet passage in the engine block 2. In some examples, the throttle valve 17 takes the form of a throttle element (E gas) controlled by an electric motor, whose opening cross section, in addition to the actuation by the driver (driver request), can be adjusted, depending on the operating zone of the internal combustion engine 100, via signals from an electronic control device 8. At the same time, a signal is outputted to the control device 8 for monitoring and checking the position of the throttle valve 17.

The engine block 2 includes a crankshaft 21 which is coupled via a connecting rod 22 to a piston 23 of the cylinder Z1. The driving power generated by the combustion process is transmitted via the crankshaft 21 to the drive train of a motor vehicle (not shown). The piston 23 and the cylinder Z1 delimit a combustion chamber 24.

The cylinder head 3 includes a valve drive with at least one gas inlet valve 31, at least one gas outlet valve 32, and drive devices (not shown in detail) for these valves. This takes the form of what is referred to as a variable valve drive, in which the actuation of the at least one gas inlet valve 31 and/or the at least one gas outlet valve 32 is substantially, or even fully, decoupled from the movement of the crankshaft 21. The cylinder head 3 further includes a fuel injection valve (injector) 33 and a spark plug 34.

The exhaust gas tract 4 leads off from the combustion chamber 24, and in the further course of it are arranged a turbine 41 of the exhaust gas turbocharger, which is connected to the compressor 14 via a shaft (not further identified), an exhaust gas sensor 42 in the form of a lambda probe, and an exhaust gas catalytic converter 43. The exhaust gas catalytic converter 43 may be designed as a three-way catalytic converter and/or as an NOx storage catalytic converter. The NOx storage catalytic converter serves to enable compliance with the required exhaust gas limit values in lean-burn operating zones. By virtue of its coating, it adsorbs the NOx compounds generated in the exhaust gas under lean-burn conditions. Furthermore, a particulate filter may be provided in the exhaust gas tract 4, and this can also be integrated in the exhaust gas catalytic converter 43.

A bypass around the compressor 14 of the exhaust gas turbocharger with an overrun air recirculation valve, and a bypass around the turbine of the exhaust gas turbocharger with a wastegate valve, are not shown in the interests of clarity.

A fuel supply device (only partially shown) supplies the fuel injection valve 33 with fuel KST and is assigned to the internal combustion engine 100. Here, the fuel KST is conveyed in a known manner from a fuel storage tank 5 by an electric fuel pump 51 (in-tank pump, low-pressure fuel pump), which is generally arranged within the fuel storage tank 5 and has a pre-filter, at low pressure (typically <5 bar), and is then conducted via a low-pressure fuel line containing a fuel filter to an input of a high-pressure fuel pump. This high-pressure fuel pump is driven either mechanically by coupling to the crankshaft 21 of the internal combustion engine 100, or electrically. It increases the fuel pressure in an Otto-cycle gasoline driven internal combustion engine 100 to a value of typically 200-300 bar, and pumps the fuel KST via a high-pressure fuel line into a high-pressure fuel accumulator (common rail), to which is connected a supply line for the fuel injection valve 33 and which thus supplies the fuel injection valve 33 with pressurized fuel, so that fuel can be injected into the combustion chamber 24.

The pressure in the high-pressure fuel accumulator is detected by a pressure sensor. Depending on the signal from this pressure sensor, the pressure in the high-pressure fuel accumulator is set to either a constant or a variable value by way of a pressure regulator. Excess fuel is returned either to the fuel storage tank 5 or to the input line of the high-pressure fuel pump.

A fuel evaporation retention system 6, referred to below in simplified form as a tank ventilation device, is also assigned to the internal combustion engine 100. The tank ventilation device 6 includes a fuel vapor retention filter 61 which contains, for example, activated carbon 62 and is connected via a connecting line 63 to the fuel storage tank 5. The fuel vapors generated in the fuel storage tank 5, especially the volatile hydrocarbons, are thus conducted into the fuel vapor retention filter 61 and are adsorbed there by the activated carbon 62. An electromagnetic shut-off valve 64, which can be actuated by signals from the control device 8, is inserted in the connecting line 63 between the fuel storage tank 5 and the fuel vapor retention filter 61. This shut-off valve 64, also referred to as a roll-over valve, is automatically closed in the event of an extreme tilt of the motor vehicle or roll-over of the motor vehicle, and therefore no liquid fuel KST can leak from the fuel storage tank 5 into the environment and/or enter the fuel vapor retention filter 61.

The fuel vapor retention filter 61 is connected via a regeneration line 65 to the intake tract 1 at a location downstream of the air filter 11 and upstream of the compressor 14. To adjust the gas flow in the regeneration line 65, a flow control valve 66, usually referred to as tank ventilation valve, can be controlled by signals from the electronic control device 8. The activation signal takes the form, for example, of a pulse width modulated signal (PWM signal).

In order that purging and thus regeneration of the fuel vapor retention filter 61 can take place even with a dethrottled intake pipe or in pressure-charged operation of the internal combustion engine 100, an electrically driven purge air pump 67 is arranged in the regeneration line 65.

Furthermore, a venting line 68 connected to the environment via an air filter 69 is provided on the fuel vapor retention filter 61. A venting valve 70, which can be controlled by signals from the electronic control device 8, is arranged in the venting line 68.

The purge air pump 67, also referred to as active purge air pump (APP), may be designed as an electrically driven centrifugal pump or radial pump and can be regulated in its rotational speed.

Upstream of the purge air pump 67, a pressure sensor 71 which supplies a value p_up corresponding to the pressure at the input of the purge air pump 67 is provided in the regeneration line 65. The pressure sensor 71 can also be integrated with a temperature sensor to form one component such that the density of the purging gas and thus the vaporous fuel mass introduced into the intake tract 1 can also be determined from an evaluation of these signals.

Downstream of the purge air pump 67, a pressure sensor 72 which supplies a value p_down corresponding to the pressure at the outlet of the purge air pump 67 is provided in the regeneration line 65.

Instead of two separate pressure sensors 71, 72, it is also possible to use a differential pressure sensor 73, as shown by a dashed line in FIG. 1, which supplies the signal corresponding to the pressure differential $\Delta APP = p\_down - p\_up$.

Various sensors which detect measured variables and determine the measured values of the measured variables are assigned to the electronic control device 8. Operating variables include not only the measured variables but also variables derived therefrom. Depending on at least one of the operating variables, the control device 8 controls the actuators, which are assigned to the internal combustion engine 100, and which are each assigned corresponding actuator drives, by the generation of actuating signals for the actuator drives.

The sensors are, for example, the air mass meter 13, which detects an air mass flow upstream of the compressor 14, the temperature sensor 12, which detects an intake air temperature, the ambient air pressure sensor 16, which provides a signal AMP, the pressure sensors 71, 72, 73, a temperature sensor 26, which detects the temperature of the coolant of the internal combustion engine 100, the pressure sensor 18, which detects the intake pipe pressure downstream of the throttle valve 17, the exhaust gas sensor 42, which detects a residual oxygen content of the exhaust gas and the measurement signal of which is characteristic of the air/fuel ratio in the cylinder Z1 in the course of the combustion of the air/fuel mixture. Signals from further sensors that are necessary for the control and/or regulation of the internal combustion engine 100 and its ancillary components are identified in general terms by the reference symbol ES in FIG. 1.

Depending on the refinement, any desired subset of the specified sensors can be present, or additional sensors can also be present.

The actuators, which the control device 8 controls by actuating signals, are, for example, the throttle valve 17, the fuel injection valve 33, the spark plug 34, the flow control valve 66, the shut-off valve 64, the venting valve 70 and the purge air pump 67.

Actuating signals for further actuators of the internal combustion engine 100 and its ancillary components are identified in FIG. 1 in general terms by the reference symbol AS.

In addition to the cylinder Z1, further cylinders Z2 to Z4 are also provided, to which corresponding actuators are also assigned.

The electronic control device 8 may also be referred to as engine control unit. Such control devices 8, which usually include one or more microprocessors, are known per se, and therefore only the design relevant in the context of the disclosure and its operation will be discussed below.

The control device 8 includes a computing unit (processor) 81, which is coupled to a program memory 82 and a value memory (data store) 83. The program memory 82 and the value memory 83 store programs or values which are required for the operation of the internal combustion engine 100. Inter alia, a function FKT_TEV for controlling the internal combustion engine 100 during a tank ventilation period is implemented in software in the program memory 82, for example, for determining and setting a desired value for the purging flow, and for determining the degree of loading of the fuel vapor retention filter 61. For this purpose, in the control device 8 are provided control electronics for controlling the purge air pump 67 and for evaluating the pressure differential ΔAPP built up by the purge air pump 67, as will be explained in more detail below.

With the aid of the purge air pump 67, it is possible to adjust the desired purging flow of the purging gas (HC/air mixture) from the fuel vapor retention filter 61 for all operating points of the internal combustion engine 100. With a high HC content in the purging gas, the purging flow has to be smaller than in the case of a nearly empty fuel vapor retention filter 61. At the time of opening the flow control valve 66, the HC content in the purging gas has to be known with high accuracy, since this has to be taken into account in the calculation of the quantity of fuel to be injected for the current operating point of the internal combustion engine 100.

If the purge air pump 67 is operated with the flow control valve 66 closed, the pressure differential ΔAPP generated across the purge air pump 67 ensues in accordance with the following relationship:

$$\Delta APP = \frac{\rho}{2}(2\pi r f)^2 \qquad (1)$$

Where ρ is the density of the purging gas, f is the rotational speed of the impeller of the purge air pump, and r is the radius of the impeller of the purge air pump As a result of the centrifugal forces of the medium conveyed, that is to say, of the purging gas in the purge air pump 67, the pressure generated at a predetermined rotational speed depends on the density of the purging gas. The densities of hydrocarbons differ from the density of air. Thus, for example, at a temperature of 0° C. and ambient pressure, the density of air is approx. 1.29 kg/m$^3$ and the density of pure butane is 2.48 kg/m$^3$.

If the rotational speed f is constant, then the pressure differential ΔAPP is proportional to the density p and is thus proportional to the HC content in the purging gas.

If the flow control valve 66 is closed, no purging flow flows and the pressure p_up corresponds to the ambient pressure AMP.

Thus, by way of a brief build-up of pressure by control of the purge air pump 67 with the flow control valve 66 closed, and at a predetermined rotational speed of the purge air pump 67, conclusions can be drawn from the measured pressure differential ΔAPP as to the HC concentration in the purging gas.

If this step is performed before the start of the actual purging phase (open flow control valve 66), the initial opening of the flow control valve 66 can take place significantly faster and with a more precise correction of the injection mass.

A characteristic map KF, in which, depending on the values of the pressure differential ΔAPP determined, related values for the HC concentration of the purging gas are stored, is stored in the value memory 83 of the control device 8. The characteristic map is determined experimentally on the test stand. The values for the pressure differential ΔAPP are either determined in the control device 8 from the individual pressure values P_up and P_down upstream or downstream, respectively, of the purge air pump 67 by the formation of corresponding differentials, or the values ΔAPP delivered by the differential pressure sensor 73 are entered directly.

The principle of determining HC concentration on the basis of the differential pressure across the purge air pump also functions during the purging process in combination with a pulse width modulated activation signal (PWM signal) for the flow control valve. All that is necessary for this purpose is to carry out the evaluation of the pressure signals in the control device at a sufficient sampling rate synchronously to the PWM activation of the flow control valve. With a suitable downstream filtering process which is known per se, a value for the differential pressure, which is proportional to the HC concentration of the purging gas, is then produced.

Figure 2:
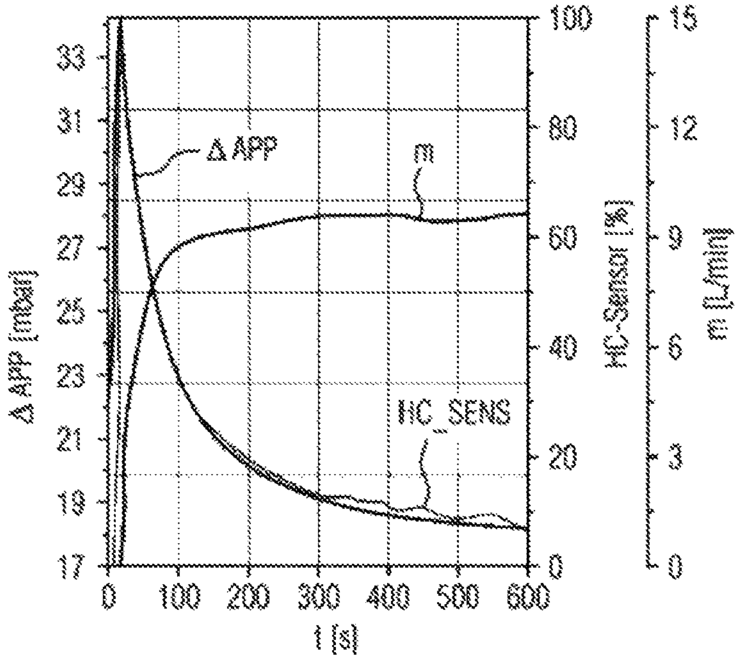
FIG. 2 shows an exemplary diagram for the relationship between the pressure differential across the purge air pump and the measured HC concentration over time with a steadily decreasing HC concentration.

The diagram in FIG. 2 shows the time profile of the pressure differential ΔAPP determined according to the method according of the disclosure, and the purge air mass flow rate m arising as the HC concentration steadily decreases. In addition, a characteristic curve HC_SENS is entered, indicating the profile of the HC concentration, which is supplied by an HC sensor arranged upstream of the purge air pump 67 only for validating the correctness and usability of the specified method. From this, it can clearly be seen that the above-described relationship is given with very great accuracy; the two curves ΔAPP and HC_SENS are almost identical.

Figure 3:
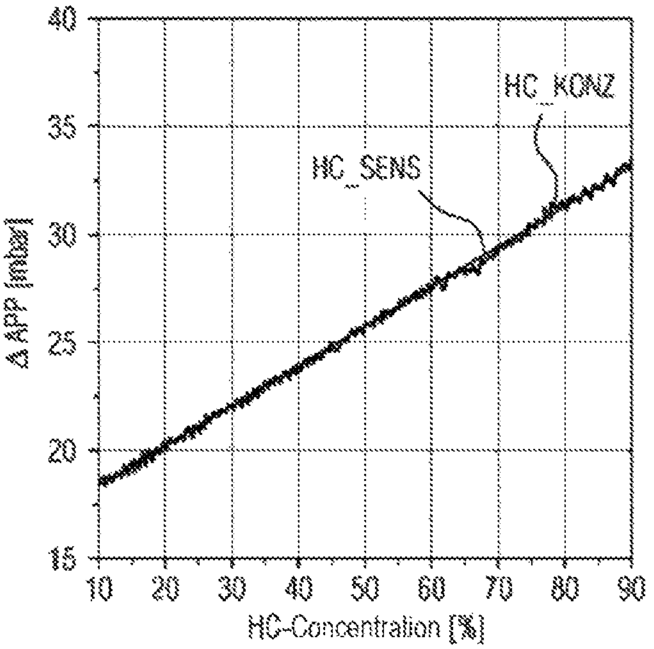
FIG. 3 shows a diagram for the relationship between the pressure differential across the purge air pump and the HC concentration.

In the diagram in FIG. 3, the relationship between the pressure differential ΔAPP and the HC concentration determined using the method according to the disclosure is shown (curve HC_KONZ). Here too the relationship between the pressure differential ΔAPP and the HC concentration HC_SENS, which is provided by the abovementioned HC sensor, is additionally plotted again. The two curves are identical to the extent of the measurement accuracy. The pressure differential ΔAPP is directly proportional to the HC concentration.

Here, the measurement or determination of the differential pressure ΔAPP was carried out with a purge air pump 67 designed as a centrifugal pump at a predetermined rotational speed of 30,000 rpm and a PWM activation signal for the flow control valve 66 with a duty cycle of 50%. It is merely necessary to keep the rotational speed of the pump constant during the measurement/determination.

Figure 4:
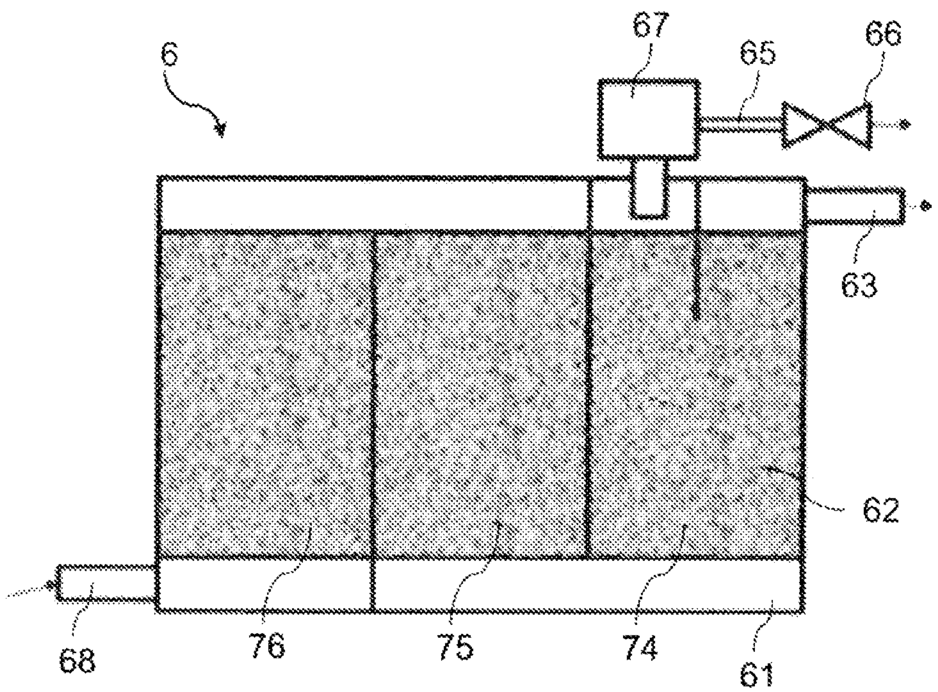
FIG. 4 shows a schematic illustration of a fuel evaporation retention system with a fuel vapor retention filter according to a first example.

FIG. 4 shows part of a fuel evaporation retention system 6 according to the disclosure with the fuel vapor retention filter 61, the purge air pump 67 and the tank ventilation valve 66. The fuel vapor retention filter 61 has a first chamber 74, a second chamber 75 and a third chamber 76, which are arranged between a venting line 68 (bottom left) and a connecting line 63 (top right) to the fuel storage tank 6 and a regeneration line 65 to the intake tract of the engine (not shown). When HC evaporates from the fuel (e.g., gasoline) in the fuel storage tank 6, it flows through the connecting line 63 into the fuel vapor retention filter 61 and is stored in the filter material in the three chambers 74, 75, 76.

Figure 5:
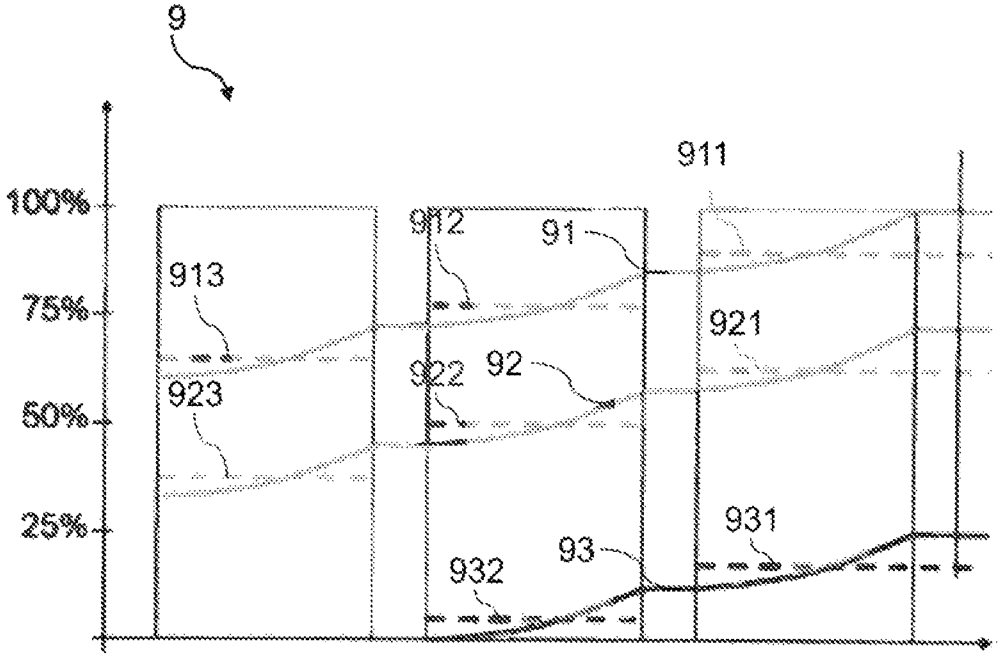
FIG. 5 shows a schematic illustration of the percentage loading of the fuel vapor retention filter according to the first example.

FIG. 5 shows a schematic loading diagram 9 of the percentage loading of each chamber 74, 75, 76 of the fuel vapor retention filter 61 with a total loading of the fuel vapor retention filter 61 of 75%, 55% and 10%, respectively.

Here, the curve 91 shows the loading at each point in the fuel vapor retention filter 61 between the air side (left) and the tank side (right) during the loading of the fuel vapor retention filter 61. As is seen, the loading decreases from the tank side toward the air side. After loading, diffusion within each chamber 74, 75, 76 leads to a uniform loading throughout the chamber; this is shown with the dashed curves 911, 912, 913. An HC portion on the tank side (far right in FIG. 5) of approximately 90%, corresponding to the curve 911, thus corresponds to a total loading of the activated carbon filter of 75%.

The curve 92 similarly shows the profile of the loading in the chambers 74, 75, 76 (during loading) when the total loading of the fuel vapor retention filter 61 is equal to 55%. The dashed curves 921, 922, 923 show the loadings in the individual chambers at rest (after equalization by diffusion). Based on the curve 923, an HC portion on the tank side of approximately 60% thus corresponds to a total loading of the fuel vapor retention filter 61 of 50%.

Curve 93 similarly shows the profile of the loading in the chambers 74, 75, 76 (during loading) when the total loading of the fuel vapor retention filter 61 is equal to 10%. The dashed curves 931, 932 show the loadings in the individual chambers at rest (after equalization by diffusion). Based on the curve 931, an HC portion on the tank side of approximately 20% thus corresponds to a total loading of the fuel vapor retention filter 61 of 10%.

A number of implementations have been described. Nevertheless, it will be understood that various modifications may be made without departing from the spirit and scope of the disclosure. Accordingly, other implementations are within the scope of the following claims.

What is claimed is:

1. A method for determining a loading of a fuel vapor retention filter in a fuel evaporation retention system of an internal combustion engine, the method comprises:
- providing a fuel storage tank for storing fuel;
- providing a connecting line, the connecting line coupling the fuel storage tank to the fuel vapor retention filter;
- providing a regeneration line, the regeneration line coupling the fuel vapor retention filter to an intake tract of the internal combustion engine and having an electrically controllable flow control valve;
- providing a venting line, the venting line coupling the fuel vapor retention filter to the atmosphere;
- providing an electrically activatable purge air pump arranged in the regeneration line, such that purge air can be conducted through the fuel vapor retention filter and supplied to the intake tract for regenerating the fuel vapor retention filter;
- switching on the purge air pump with the flow control valve closed;
- upon reaching a constant rotational speed of an impeller of the purge air pump conveying the purge air:
  - detecting a value for a pressure in the regeneration line upstream of the purge air pump, and
  - detecting a value for the pressure in the regeneration line downstream of the purge air pump;
- determining a value for a differential pressure across the purge air pump based on the pressure values; and
- assigning a value for a degree of loading of the fuel vapor retention filter to the value for the differential pressure;
- wherein the method is carried out during one or more predetermined periods of time and/or one or more predetermined operating phases of the internal combustion engine and the respectively determined degrees of loading of the fuel vapor retention filter are taken into account in the injection calculation of the internal combustion engine,
- wherein at least one of the periods of time is a heating phase of the fuel storage tank or a cooling-down phase of the fuel storage tank.

2. The method of claim 1, wherein at least one of the periods of time is a period of time with a constant temperature of the fuel storage tank.

3. The method of claim 1, wherein the method is carried out over a plurality of periods of time and/or operating phases of the internal combustion engine and the degrees of loading in each case determined therefrom are taken into account when determining the current degree of loading of the fuel vapor retention filter.

4. The method of claim 1, wherein the assignment takes place by a characteristic map stored in a control device which controls and/or regulates the internal combustion engine.

5. The method of claim 4, wherein the values for the degree of loading that are stored in the characteristic map are determined on a test stand.

6. The method of claim 1, wherein the pressure values are supplied by two separate pressure sensors, and the value for the differential pressure is obtained by calculating the difference between the two pressure values.

7. The method of claim 1, wherein the value for the differential pressure is obtained by a differential pressure sensor, fluid connections of which open out into the regeneration line upstream and downstream of the purge air pump.

8. An internal combustion engine, comprising:
- a fuel evaporation retention system comprising:
  - a fuel storage tank for storing fuel;
  - a fuel vapor retention filter;
  - a connecting line, which couples the fuel storage tank to the fuel vapor retention filter;
  - a regeneration line, which couples the fuel vapor retention filter to an intake tract of the internal combustion engine, and in which an electrically activatable flow control valve is arranged;
  - a venting line, which couples the fuel vapor retention filter to the atmosphere;
  - an electrically activatable purge air pump arranged in the regeneration line, such that purge air can be conducted through the fuel vapor retention filter and supplied to an intake tract of the internal combustion engine for regenerating the fuel vapor retention filter; and a pressure sensor arrangement for determining pressure values upstream and downstream of the purge air pump; and a control device for determining a loading of the fuel vapor retention filter, the control device configured to execute a method comprising:

switching on the purge air pump with the flow control valve closed;

upon reaching a constant rotational speed of an impeller of the purge air pump conveying the purge air:

detecting a value for the pressure in the regeneration line upstream of the purge air pump, and detecting a value for the pressure in the regeneration line downstream of the purge air pump;

determining a value for a differential pressure across the purge air pump based on the pressure values; and assigning a value for a degree of loading of the fuel vapor retention filter to the value for the differential pressure;

wherein the method is carried out during one or more predetermined periods of time and/or one or more predetermined operating phases of the internal combustion engine and the respectively determined degrees of loading of the fuel vapor retention filter are taken into account in the injection calculation of the internal combustion engine, wherein at least one of the periods of time is a heating phase of the fuel storage tank or a cooling-down phase of the fuel storage tank.

9. The internal combustion engine of claim 8, wherein at least one of the periods of time is a period of time with a constant temperature of the fuel storage tank.

10. The internal combustion engine of claim 8, wherein the method is carried out over a plurality of periods of time and/or operating phases of the internal combustion engine and the degrees of loading in each case determined therefrom are taken into account when determining the current degree of loading of the fuel vapor retention filter.

11. The internal combustion engine of claim 8, wherein the assignment takes place by means of a characteristic map stored in a control device which controls and/or regulates the internal combustion engine.

12. The internal combustion engine of claim 11, wherein the values for the degree of loading that are stored in the characteristic map are determined on a test stand.

13. The internal combustion engine of claim 8, wherein the pressure values are supplied by two separate pressure sensors, and the value for the differential pressure is obtained by calculating the difference between the two pressure values.

14. The internal combustion engine of claim 8, wherein the value for the differential pressure is obtained by a differential pressure sensor, fluid connections of which open out into the regeneration line upstream and downstream of the purge air pump.

* * * * *